(12) United States Patent
Kozuka (10) Patent No.: US 12,172,355 B2
(45) Date of Patent: Dec. 24, 2024

(54) METHOD AND DEVICE FOR ASSISTING MOLDING CONDITION SETTING TECHNICAL FIELD

(71) Applicant: NISSEI PLASTIC INDUSTRIAL CO., LTD., Nagano-ken (JP)

(72) Inventor: Makoto Kozuka, Hanishina-gun (JP)

(73) Assignee: NISSEI PLASTIC INDUSTRIAL CO., LTD., Hanishina-Gun (JP)

( * ) Notice: Subject to any disclaimer, the term of this patent is extended or adjusted under 35 U.S.C. 154(b) by 0 days.

(21) Appl. No.: 17/959,460

(22) Filed: Oct. 4, 2022

(65) Prior Publication Data

US 2023/0022193 A1    Jan. 26, 2023

Related U.S. Application Data

(62) Division of application No. 16/482,179, filed as application No. PCT/JP2018/001571 on Jan. 19, 2018, now Pat. No. 11,498,254.

(30) Foreign Application Priority Data

Jan. 31, 2017   (JP) .................................. 2017-016062

(51) Int. Cl.
*B29C 45/78*    (2006.01)
*B29C 45/76*    (2006.01)

(52) U.S. Cl.
CPC ............ *B29C 45/78* (2013.01); *B29C 45/766* (2013.01); *B29C 2945/76187* (2013.01);
(Continued)

(58) Field of Classification Search
CPC .................. B29C 45/78; B29C 45/766; B29C 2945/76187; B29C 2945/76939; B29C 2945/76003
(Continued)

(56) References Cited

U.S. PATENT DOCUMENTS 6,051,170 A      4/2000  Kamiguchi et al.
2013/0181362 A1  7/2013  Kitchloo et al.

FOREIGN PATENT DOCUMENTS

JP    7-214629 A    8/1995
JP    9/216265 A    8/1997
(Continued)

OTHER PUBLICATIONS

Uchiyama, T. et al, "State Monitoring Device of Resin of Injection Molding Machine", English translation of JP2013202807A by Clarivate Analytics, with full Japanese patent application merged into document, 2013. (Year: 2013).*
(Continued)

*Primary Examiner* — S. Behrooz Ghorishi
*Assistant Examiner* — Gregory C. Grosso
(74) *Attorney, Agent, or Firm* — Birch, Stewart, Kolasch & Birch, LLP (57) ABSTRACT

A database 3 is previously set which is related to oxidation induction times Tg indicating the deteriorations of individual resins R based on the combinations of a plurality of oxidation induction conditions X including at least different types of resins R and different heating temperatures TH, when the molding condition is set, oxidation induction time derivation processing is performed such that an oxidation induction time Tg based on oxidation induction conditions X including at least the resin R which is used and the heating temperature TH which is set is determined from the database 3 and assistance processing is performed in which the determined oxidation induction time Tg is compared with a residence time Ts until the molten resin R is charged into a mold 2 that is calculated from the set molding condition and in which when the oxidation induction time Tg is shorter than the residence time Ts, the molding condition is cor-
(Continued)

rected so as to shorten the residence time Ts or to prolong the oxidation induction time Tg.

6 Claims, 6 Drawing Sheets

(52) U.S. Cl.
CPC .............. *B29C 2945/76367* (2013.01); *B29C 2945/76381* (2013.01); *B29C 2945/76939* (2013.01)

(58) Field of Classification Search
USPC ................................ 264/40.1; 700/197, 204
See application file for complete search history.

(56) References Cited

FOREIGN PATENT DOCUMENTS

| JP | 2010-99995 A | 5/2010 |
| JP | 2011-201098 A | 10/2011 |
| JP | 2013-202807 A | 10/2013 |
| JP | 2017-209880 A | 11/2017 |

OTHER PUBLICATIONS

Uchiyama, T. et al, "State Monitoring Device of Resin of Injection Molding Machine", English translation of JP2013202807A by Clarivate Analytics, with full Japanese patent application merged into document, 2013. (See NPL filed on Sep. 20, 2023). (Year: 2013).*
International Search Report (PCT/ISA/210) issued in PCT/JP2018/001571, mailed on Apr. 17, 2018.
JP2013202807A (Uchiyama) English-language translation by patents.google.com, 2013. (Year: 2013).
Manabe et al., "Influence of metals on thermo oxidative degradation of polypropylene and its evaluation methods", Japan Analyst, 2011, vol. 60, No. 3, ISSN: 0525-1931, pp. 283-291, particularly, pp. 283, 284.

\* cited by examiner

| SPECIMEN | SURFACE MATERIAL | OXIDATION INDUCTION TIME (min) | ELECTRON AFFINITY DIFFERENCE |
|---|---|---|---|
| A | Cr | 16 | 65 |
| B | CrN | 12.6 | 72 |
| C | Cr₂N | 19.9 | −8 |
| D | TiN | 17.0 | 16 |
| E | TiC | 28.8 | −116 |
| F | MRS | 21.4 | 40 |
| G | SiC | 16.8 | 10 |
| H | NiP | 20.8 | 40 |

METHOD AND DEVICE FOR ASSISTING MOLDING CONDITION SETTING

TECHNICAL FIELD

CROSS-REFERENCE TO RELATED APPLICATIONS

This application is a Divisional of copending application Ser. No. 16/482,179, filed on Jul. 30, 2019, which is the National Phase under 35 U.S.C. § 371 of International Application No. PCT/JP2018/001571, filed on Jan. 19, 2018, which claims the benefit under 35 U.S.C. § 1.119 (a) to Patent Application No. 2017-016062, filed in Japan on Jan. 31, 2017, all of which are hereby expressly incorporated by reference into the present application.

TECHNICAL FIELD

The present invention relates to a method and a device for assisting a molding condition setting which are suitably used when molding conditions are set in a molding machine that charges a resin heated at a predetermined heating temperature into a mold so as to mold the resin.

BACKGROUND ART

In general, when an abnormality occurs while a molding machine is being automatically operated, in order for a secondary problem to be avoided, the automatic operation is rapidly stopped. In this case, since after the stopping, a resin left in a residence state may be deteriorated, in general, the automatic operation of the molding machine is stopped, and simultaneously, processing (processing for abnormality) which is necessary for preventing the deterioration of the resin is performed.

Conventionally, as the processing for abnormality as described above, a processing method for abnormality in an injection molding machine which is proposed by the present applicant and which is disclosed in patent literature 1 has already been known. The processing method for abnormality described above is designed to rapidly restart an automatic operation which allows the production of satisfactory articles, to prevent production efficiency from being significantly lowered due to the occurrence of an abnormality and to optimize the processing for abnormality for the level of an abnormality which is selected. Specifically, when an abnormality occurs that is related to the level of an abnormality which is previously selected, by measuring a first monitoring time after the occurrence of the abnormality, the restart of the automatic operation is allowed on condition that the abnormality is removed before the first monitoring time is up, the restart of the automatic operation is also allowed on condition that the abnormality is removed after the first monitoring time is up and that purge processing is performed, a second monitoring time is measured at least when the abnormality occurs or after the first monitoring time is up and when the abnormality is not removed before the second monitoring time is up, a heat retention mode is entered after the second monitoring time is up.

CITATION LIST

Patent Literature

Patent Literature 1: Japanese Unexamined Patent Application Publication No. 2011-201098

SUMMARY OF INVENTION

Technical Problem

However, in the conventional processing method for abnormality in the injection molding machine which is described above, problems to be solved as described below are present.

Firstly, although this method is basically a processing method for avoiding the deterioration of the resin that results from the fact that the residence time of the resin residing in an injection device is prolonged by the interruption of the operation, factors for the prolongation of the residence time of the resin in the injection molding machine (molding machine) are caused not only by the interruption of the operation. For example, factors such as a case based on the nonconformity of molding conditions and a case where depending on the type of resin used, a degradation rate is faster than expected can also be considered. Hence, it is insufficient to take only measures using the conventional processing method for abnormality, and it is not necessarily sufficient to do so in terms of reliably avoiding the deterioration of the molten resin.

Secondly, although the selection of the resin to be used and the setting of molding conditions are generally performed on the side of a user, the user not necessarily has sufficient knowledge, experience and the like on the deterioration of the resin in a residence state. Hence, it is impossible for the user to easily make the setting of molding conditions with consideration given to the deterioration of the resin, and even when the molding machine appears at first glance to be satisfactorily operated, it is impossible to easily cope with a case where a defective is produced which is caused by the deterioration of the resin resulting from a mismatch between the type of resin and the molding conditions (such as a residence time).

An object of the present invention is to provide a method and a device for assisting a molding condition setting which solve the problems present in the background technology as described above.

Solution to Problem

In order to solve the problems described above, in a method for assisting a molding condition setting according to the present invention, when a molding condition is set in a molding machine Mo for charging a resin R molten by heating at a predetermined heating temperature TH into a mold 2 so as to mold the resin, a database 3 is previously set which is related to oxidation induction times Tg indicating the deteriorations of individual resins R based on the combinations of a plurality of oxidation induction conditions including at least different types of resins R and different heating temperatures TH, when the molding condition is set, oxidation induction time derivation processing is performed such that an oxidation induction time Tg based on oxidation induction conditions including at least the resin R which is used and the heating temperature TH which is set is determined from the database 3 and assistance processing is performed in which the determined oxidation induction time Tg is compared with a residence time Ts until the molten resin R is charged into the mold 2 that is calculated from the and in which when the oxidation induction time Tg is shorter than the residence time Ts, the molding condition is corrected so as to shorten the residence time Ts or to prolong the oxidation induction time Tg.

In this case, according to a preferred aspect of the invention, the oxidation induction conditions preferably include the type of surface material Mf of a screw 4 in an injection molding machine M. In the oxidation induction time derivation processing, when the heating temperature TH is set, the highest heating temperature TH of a plurality of heating temperatures TH can be set. Furthermore, the assistance processing may be display processing in which the residence time Ts and the oxidation induction time Tg determined from the database 3 are displayed on a predetermined time display portion 5 or may be automatic correction processing in which based on the result of the comparison between the residence time Ts and the oxidation induction time Tg determined from the database 3, the molding condition that is set is automatically corrected. Here, the automatic correction processing may include residence time correction processing which shortens the residence time Ts or may include heating temperature correction processing which lowers the heating temperature TH.

On the other hand, in order to solve the problems described above, a device 1 for assisting a molding condition setting according to the present invention configures an assisting device which is used when a molding condition is set in a molding machine Mo for charging a resin R molten by heating at a predetermined heating temperature TH into a mold 2 so as to mold the resin R, and includes: a database 3 in which oxidation induction times Tg indicating the deteriorations of individual resins R based on the combinations of a plurality of oxidation induction conditions including at least different types of resins R and different heating temperatures TH are set; an oxidation induction time derivation function unit Fg that determines, from the database 3, an oxidation induction time Tg based on oxidation induction conditions including at least the resin R which is used and the heating temperature TH which is set; and a correction assistance function unit Fs that performs assistance processing in which the oxidation induction time Tg determined with the oxidation induction time derivation function unit Fg is compared with a residence time Ts until the molten resin R is charged into the mold 2 that is calculated from the set molding condition and in which when the oxidation induction time Tg is shorter than the residence time Ts, the molding condition is corrected so as to shorten the residence time Ts or to prolong the oxidation induction time Tg.

In this case, according to a preferred aspect of the invention, the oxidation induction conditions preferably include the type of surface material Mf of a screw 4 in an injection molding machine M. The oxidation induction time derivation function unit Fg can include a setting screen display function unit Fv that displays an input setting screen Vi on which at least the type of resin R and the heating temperature TH are input. Furthermore, the database 3 can include a data table and/or a computation formula. On the other hand, the correction assistance function unit Fs may include a time display function unit Ft which displays, on a predetermined time display portion 5, the residence time Ts and the oxidation induction time Tg determined from the database 3 or may include an automatic correction function unit Fc which automatically corrects the set molding condition based on the result of the comparison between the residence time Ts and the oxidation induction time TH determined from the database 3.

Advantageous Effects of Invention

In the method and the device 1 for assisting the molding condition setting described above and according to the present invention, the following remarkable effects are produced.

(1) At the time of setting of the molding conditions, the oxidation induction time derivation processing is performed, and thus the oxidation induction time Tg based on the oxidation induction conditions including at least the resin R which is used and the heating temperature TH which is set is determined from the database 3, and the assistance processing is performed in which the determined oxidation induction time Tg is compared with the residence time Ts until the molten resin R is charged into the mold 2 that is calculated from the set molding conditions and in which when the oxidation induction time Tg is shorter than the residence time Ts, the molding conditions are corrected so as to shorten the residence time Ts or to prolong the oxidation induction time Tg. Thus, it is possible to cope with various deterioration factors at the time of molding which cause factors, other than a factor in which the operation of the molding machine Mo is interrupted so as to prolong the residence time Ts of the resin R, such as a factor in which the degradation rate is faster than expected due to the nonconformity of the molding conditions and the type of resin R to be used, with the result that it is possible to reliably avoid the deterioration of the resin R at the time of molding.

(2) Even when on the side of the user, the user does not have knowledge, experience and the like on the deterioration of the resin R in a residence state, the user can easily set the molding conditions under which the resin R is prevented from being deteriorated, with the result that, for example, a molding operation with a high yield can be performed so as to enhance productivity.

(3) According to a preferred aspect, the types of surface materials Mf of the screw 4 in the injection molding machine M are included in the oxidation induction conditions, and thus the influence of a deterioration factor based on the surface material Mf, that is, a deterioration factor caused by the catalytic effect of the metal on the resin R can be removed, with the result that it is possible to prevent the resin R from being deteriorated more dependably and reliably.

(4) According to a preferred aspect, when the heating temperature TH in the oxidation induction time derivation processing is set, the highest heating temperature TH of a plurality of heating temperatures TH is set, and thus the maximum level of the heating temperature TH serving as a deterioration factor can be applied, with the result that it is possible to contribute to more dependable deterioration prevention on the resin R with consideration given to a temperature margin.

(5) According to a preferred aspect, in the oxidation induction time derivation function unit Fg, the setting screen display function unit Fv is provided that displays the input setting screen Vi on which at least the type of resin R and the heating temperature TH are input, and thus the user can make an input (setting) such as by a selection operation according to the input setting screen Vi, with the result that it is possible to easily and rapidly derive the oxidation induction time Tg.

(6) According to a preferred aspect, the data table and/or the computation formula is included in the database 3, and thus it is possible to determine the appropriate oxidation induction time Tg which is suitable for the type and grade of injection molding machine M, details of the data or the like.

(7) According to a preferred aspect, as the assistance processing, the display processing is used in which the residence time Ts and the oxidation induction time Tg are displayed on a predetermined time display portion 5, and thus the user can simultaneously and visually confirm the residence time Ts and the oxidation induction time Tg displayed on the time display portion 5 so as to compare them, with the result that it is possible to perform correction processing on the molding conditions by a manual operation which includes intuition and know-how.

(8) According to a preferred aspect, as the assistance processing, the automatic correction processing is used which automatically corrects the molding conditions based on the result of the comparison between the residence time Ts and the oxidation induction time Tg, and thus automatic correction can be performed without dependence on the operation of the user, with the result that even when the user is a beginner or the like, it is possible to reliably avoid the deterioration of the resin R.

(9) According to a preferred aspect, in the automatic correction processing, the residence time correction processing for shortening the residence time Ts is included, and thus even when there is a limitation on the correction of the oxidation induction time Tg such as a case where the heating temperature TH can no longer be lowered, the residence time Ts can be corrected, with the result that for example, necessary correction processing such as the shortening of the cycle time can be performed.

(10) According to a preferred aspect, in the automatic correction processing, the heating temperature correction processing for lowering the heating temperature TH is included, and thus the degradation rate can be reduced by lowering the heating temperature TH, with the result that effective correction processing for prolonging the oxidation induction time Tg can easily be performed.

REFERENCE SIGNS LIST

1: device for assisting molding condition setting, 2: mold, 3: database, 4: screw, 5: time display portion, TH: heating temperature, R: resin, Mo: molding machine, M: injection molding machine, Tg: oxidation induction time, Ts: residence time, Mf: surface material of screw, Vi: input setting screen, Fg: oxidation induction time derivation function unit, Fs: correction assistance function unit, Fv: setting screen display function unit, Ft: time display function unit, Fc: automatic correction function unit

DESCRIPTION OF EMBODIMENTS

A detailed description will then be given using a preferred embodiment according to the present invention with reference to drawings.

An outline of an injection molding machine M (molding machine Mo) which includes a device 1 for assisting a molding condition setting according to the present embodiment will first be described with reference to FIG. 2.

Figure 2:
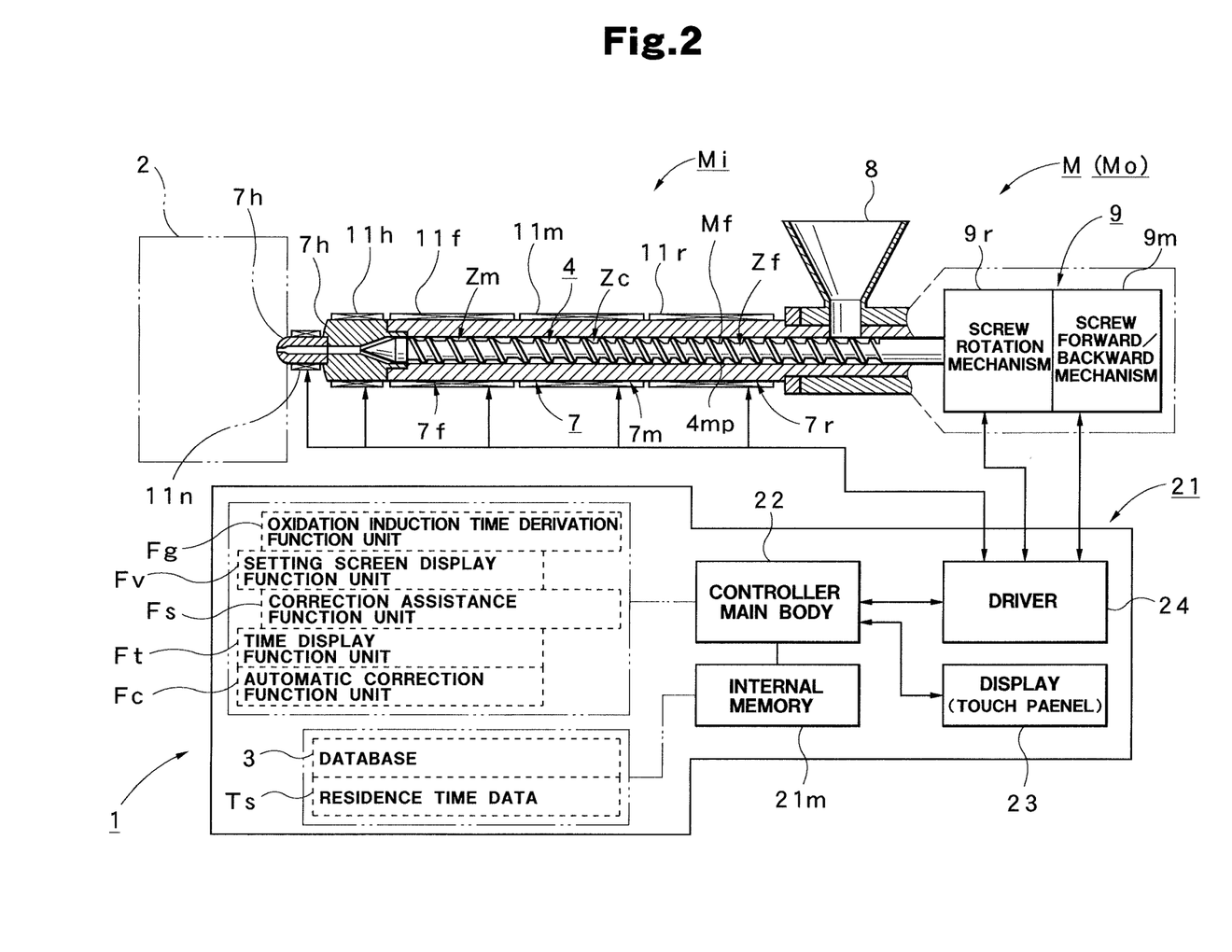
FIG. 2 a block diagram of an injection molding machine which includes a device for assisting the molding condition setting according to the preferred embodiment of the present invention.

In FIG. 2, M represents the injection molding machine and particularly represents an injection device Mi in which a clamping device is omitted. In the injection device Mi, 7 represents a heating tube, a nozzle 7*n* is attached and fixed through a head portion 7*h* to a front end portion of the heating tube 7 and a hopper 8 is provided in an upper portion of the back end of the heating tube 7. The nozzle 7*n* has the function of injecting a resin R molten within the heating tube 7 into a mold 2 indicated by imaginary lines, and the hopper 8 has the function of supplying a resin material such as pellets inside the heating tube 7.

A screw 4 is loaded inside the heating tube 7 so as to be freely turned and to be freely moved forward and backward. On the circumferential surface of the screw 4, a spiral flight portion 4*mp* is formed, and the surface of the screw 4 is coated with a predetermined surface material Mf (metal) with consideration given to durability and the like, and a metering zone Zm, a compression zone Zc and a feed zone Zf are provided from the front side to the back side. On the other hand, a back end portion of the screw 4 is coupled to a screw drive portion 9. The screw drive portion 9 includes: a screw rotation mechanism 9*r* which rotates the screw 4; and a screw forward/backward mechanism 9*m* which moves the screw 4 forward and backward. The drive method of the screw rotation mechanism 9*r* and the screw forward/backward mechanism 9*m* may be a hydraulic method using a hydraulic circuit or an electrical method using an electric motor, and the drive method is not limited.

The heating tube 7 further includes a heating tube front portion 7*f*, a heating tube middle portion 7*m* and a heating tube back portion 7*r* from the front side to the back side, and on the outer circumferential surfaces of the individual portions 7*f*, 7*m* and 7*r*, a front portion heating portion 11*f*, a middle portion heating portion 11*m* and a back portion heating portion 11*r* are provided respectively and additionally. Likewise, on the outer circumferential surface of the head portion 7*h*, a head heating portion 11*h* is additionally provided, and on the outer circumferential surface of the nozzle 7*n*, a nozzle heating portion 11*n* is additionally provided. These heating portions 11*f*, 11*m*, 11*r*, 11*h* and 11*n* can be formed with band heaters or the like.

On the other hand, 21 represents a molding machine controller which performs the overall control of the injection molding machine M. The molding machine controller 21 includes a controller main body 22 which incorporates hardware such as a CPU and an attached internal memory 21*m* and which has a computer function. A display 23 attached to the controller main body 22 and a driver 24 for driving (operating) various types of actuators are connected to the connection ports of the controller main body 22. In this case, the display 23 includes a touch panel, and with the display 23, it is possible to perform various types of operations such as a setting, a selection and an input. Furthermore, the screw rotation mechanism 9*r* and the screw forward/backward mechanism 9*m* described above are connected to the driver 24, and the individual heating portions 11*f*, 11*m*, 11*r*, 11*h* and 11*n* are connected thereto. In this way, the controller main body 22 can control the drive of the screw rotation mechanism 9*r* and the screw forward/backward mechanism 9*m* through the driver 24, and can control the energization of the individual heating portions 11*f*, 11*m*, 11*r*, 11*h* and 11*n*.

Hence, the molding machine controller 21 includes an HMI (Human Machine Interface) control system and a PLC (Programmable Logic Controller) control system, and in the internal memory 21*m*, PLC programs and HMI programs are stored. The PLC programs are software for realizing sequence operations in various types of steps in the injection molding machine M, the monitoring of the injection molding machine M and the like, and the HMI programs are software for realizing the setting and display of operation parameters for the injection molding machine M, the display of operation monitoring data of the injection molding machine M and the like. In the molding machine controller 21, the device 1 for assisting the molding condition setting according to the present embodiment is included.

The configuration of the device 1 for assisting the molding condition setting according to the present embodiment will then be described in detail with reference to FIGS. 2 to 9.

The device 1 for assisting the molding condition setting includes, as a basic configuration (function units), as shown in FIG. 2, a database 3, an oxidation induction time derivation function unit Fg and a correction assistance function unit Fs. In the oxidation induction time derivation function unit Fg, a setting screen display function unit Fv is included, and in the correction assistance function unit Fs, a time display function unit Ft and an automatic correction function unit Fc are included. These individual function units will be specifically described below.

First, in the database 3, oxidation induction times Tg are included which indicate the deteriorations of individual resins R based on the combinations of a plurality of oxidation induction conditions including at least different types of resins R and different heating temperatures TH. In the present embodiment, as the oxidation induction conditions, in addition to the types of resins R and the heating temperatures TH, the types of surface materials Mf of the screw 4 in the injection molding machine M are included. As described above, the types of surface materials Mf of the screw 4 in the injection molding machine M are included in the oxidation induction conditions, and thus the influence of a deterioration factor based on the surface material Mf, that is, a deterioration factor caused by the catalytic effect of the metal on the resin R can be removed, with the result that it is possible to prevent the resin R from being deteriorated more dependably and reliably.

The catalytic effect of the metal on the resin R which serves as the deterioration factor will be specifically described below with reference to FIGS. 3*a* to 3*c* and FIGS. 4 to 6.

Figure 3A:
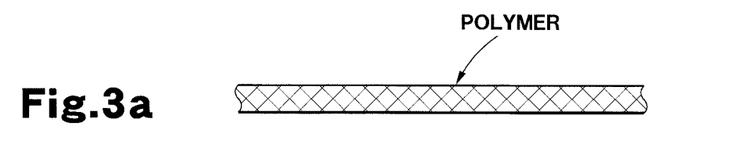
FIG. 3*a* a first stage schematic view for illustrating the principles of deterioration caused by the surface material of a metal which makes contact with a resin to be used in the method for assisting the molding condition setting.
Figure 3B:
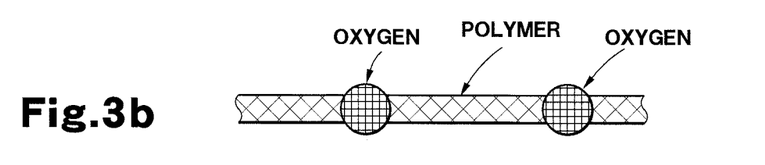
FIG. 3*b* a second stage schematic view for illustrating the principles of deterioration caused by the surface material of the metal which makes contact with the resin to be used in the method for assisting the molding condition setting.
Figure 3C:
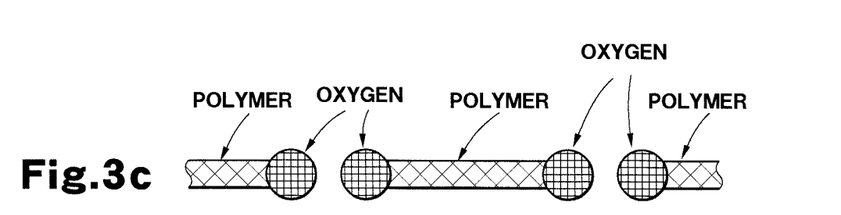
FIG. 3*c* a third stage schematic view for illustrating the principles of deterioration caused by the surface material of the metal which makes contact with the resin to be used in the method for assisting the molding condition setting.

In general, it is known that when a polymer (resin R) is heated, hydrogen is removed, and thus the polymer is changed into a polymer radical active species. In the case of the polymer radical active species, although in this state, the molecular weight of the polymer is prevented from being lowered, when it makes contact with a metal, a phenomenon occurs in which catalytic action is produced and in which thus the metal is bonded to oxygen in air and the radical so as to facilitate the decomposition of the resin R. FIGS. 3*a* to 3*c* schematically show this phenomenon. FIG. 3*a* shows a state where the polymeric material (polymer) is activated (thermally decomposed) by heat. When in this state, the catalytic activity is performed with the metal species, as shown in FIG. 3*b*, an oxidation phenomenon occurs in which oxygen is bonded to the activated polymer. Then, when the oxidation phenomenon further proceeds, as shown in FIG. 3*c*, a phenomenon occurs in which the molecular weight of the polymer is lowered by the oxidative decomposition of the polymer.

Hence, in order to reduce the decomposition of the resin R (polymer) in the injection molding machine M, it is effective to reduce the catalytic activity of the surface material Mf (metal) of the screw 4 which is brought into contact and to thereby reduce the oxidation reaction with the radical species.

Therefore, in order to check the influence of the surface material Mf of the screw 4 on the resin R in the injection molding machine M, an oxidation induction time Tg indicating the degree of activation of the catalyst caused by the surface material Mf of the screw 4 was measured with a DSC device (differential scanning calorimetry device).

Figure 4:
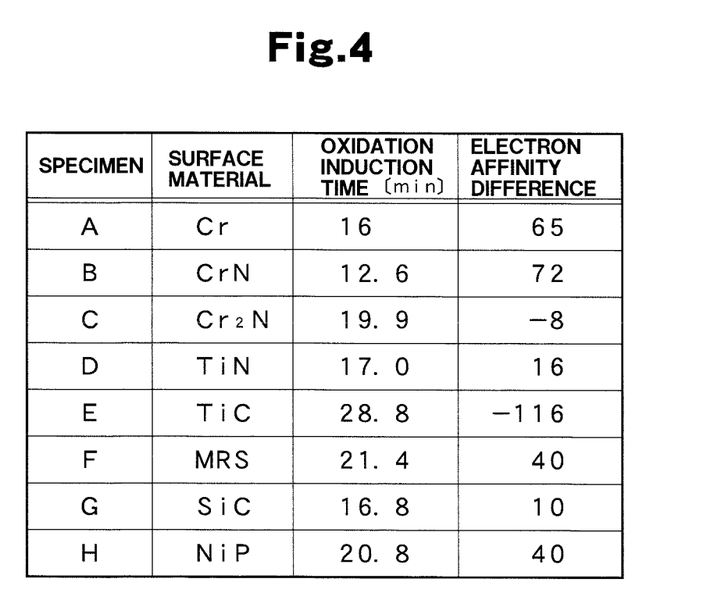
FIG. 4 a list of oxidation induction times and electron affinity differences of polyolefin resins under a heating temperature of 200° C. on various types of surface materials to be used in the method for assisting the molding condition setting.
Figure 5:
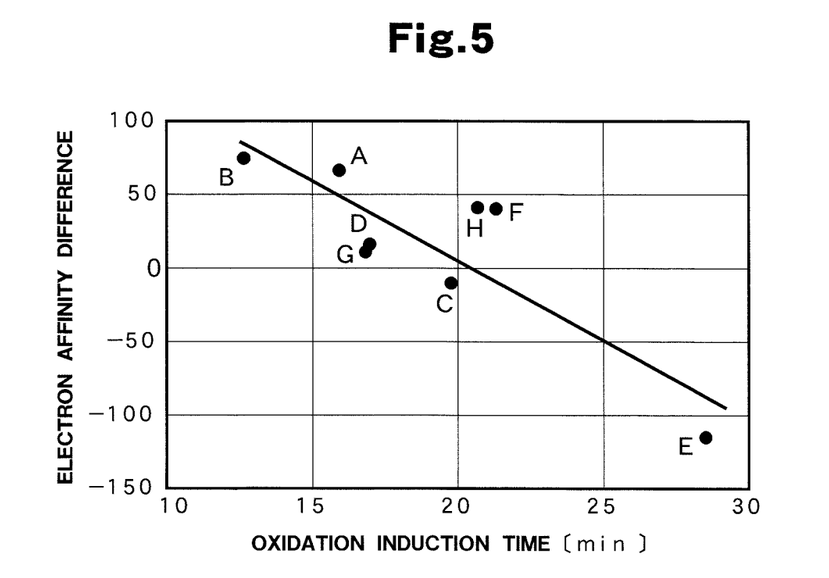
FIG. 5 a correlation diagram of the oxidation induction times and the electron affinity differences of the polyolefin resins under a heating temperature of 200° C. on the various types of surface materials to be used in the method for assisting the molding condition setting.

FIG. 4 shows a list of oxidation induction times Tg and electron affinity differences of polyolefins (resins R) on a total of 8 types of specimens A, B, C, D, E, F, G and H whose surface materials Mf were different. As the illustrated surface materials Mf, "Cr (chromium)" is for the specimen A, "CrN (chromium nitride)" is for the specimen B, "$Cr_2N$ (dichromic nitride)" is for the specimen C, "TiN (titanium nitride)" is for the specimen D, "TiC (titanium carbide)" is for the specimen E, "MRS" is for the specimen F, "SiC (silicon carbide)" is for the specimen G and "NiP (nickel plating)" is for the specimen H. FIG. 5 shows a correlation diagram of the oxidation induction times Tg and the electron affinity differences which were obtained. The oxidation induction times Tg are the results of the measurements with the DSC device. The electron affinity differences are calculated by formula (1) when the metal species is represented by MnXy.

$$\text{electron affinity difference} = \text{electron affinity of } M - \{(n-1) \times (\text{electron affinity of } M) + y \times (\text{electron affinity of } X)\} \quad (1)$$

In this case, when the metal species MnXy is, for example, "CrN", M=Cr, n=1, X=N and y=1. FIG. 5 shows that as the electron affinity difference is larger, it is easier to receive electrons, and that thus the oxidation induction times Tg are shortened. As is clear from FIG. 5, an approximate correlation is present between the electron affinity differences and the oxidation induction times Tg. Hence, a relationship between the electron affinity differences and the oxidation induction times Tg can be represented by a linear function.

Figure 6:
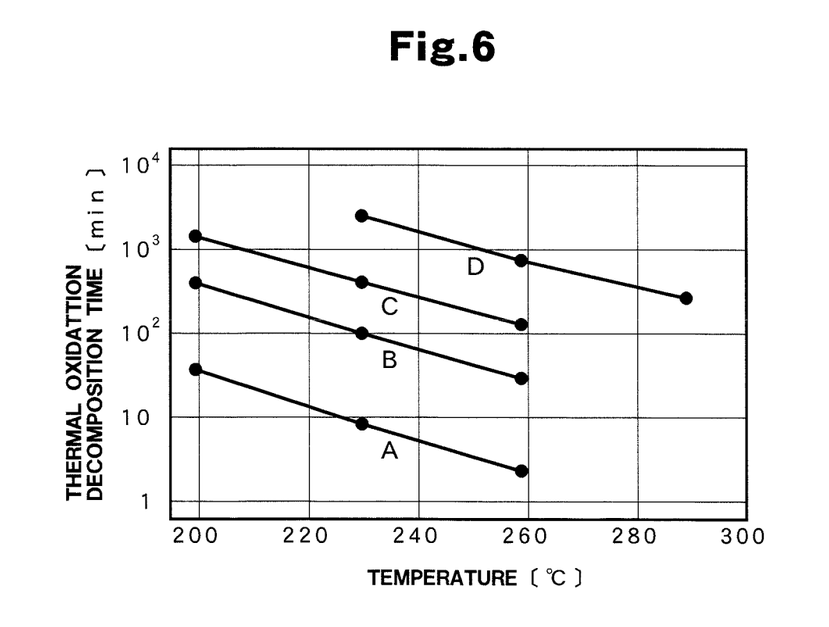
FIG. 6 a change characteristic chart of thermal oxidation decomposition times with respect to temperatures based on the types of resins to be used in the method for assisting the molding condition setting.

On the other hand, since it is difficult to apply the measurement of the oxidation induction time Tg with the DSC device to resins other than polyolefin resins which are relatively simply decomposed, thermal oxidation decomposition characteristics which are calculated by a so-called Ozawa method using reaction kinetics analysis for determining the activation energy of thermal decomposition and which are shown in FIG. 6 and formula (2) are applied to the other types of resins, and thus heating temperatures TH and oxidation induction times Tg in the resins R are calculated. In formula (2), Tu represents the thermal oxidation decomposition time of an arbitrary resin at U [C°] which is determined from FIG. 6, Td represents the thermal oxidation decomposition time of the polyolefin resins at 200 [C°] which is determined from FIG. 6 and Tgd represents the oxidation induction time of the polyolefin resins at 200 [C°] which is determined from FIG. 4.

$$\text{oxidation induction time } Tg=(Tu/Td)\times Tgd \quad (2)$$

In this case, since how the metal is coordinated differs depending on the types of resins R, it is considered that the amounts of oxygen absorbed in various types of metals and various types of resins R can be mostly applied though they cannot be completely applied.

Hence, when the database 3 in the embodiment is established, as the oxidation induction conditions, three items of the resins R, the heating temperatures TH and the surface materials Mf of the screw 4 are applied, and the oxidation induction times Tg indicating the deteriorations of the individual resins R based on the combinations of the different types of resins R, the different types of heating temperatures TH and the different types of surface materials Mf are set. Consequently, the resin R, the heating temperature TH and the surface material Mf are identified, and thus it is possible to obtain the corresponding oxidation induction time Tg from the database 3. Hence, in the database 3, a data table and/or a computation formula can be included. Thus, in the database 3, the computation formula of formula (2) and data of FIGS. 4 to 6 may be registered or the oxidation induction times Tg calculated by the computation formula of formula (2) may be registered as the data table. As described above, the data table and/or the computation formula is included, and thus it is possible to determine the appropriate oxidation induction time Tg which is suitable for the type and grade of injection molding machine M, details of the data or the like.

Figure 7:
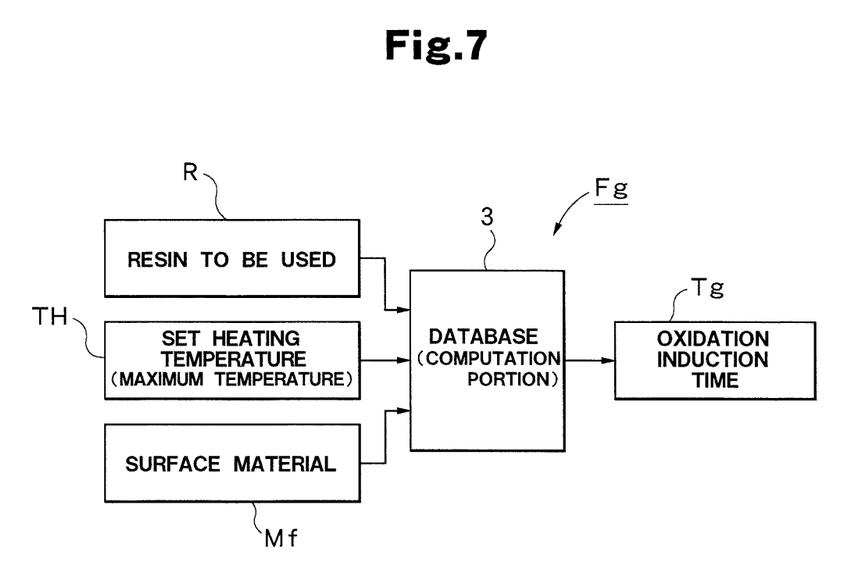
FIG. 7 a function block diagram of an oxidation induction time derivation function unit which is included in the device for assisting the molding condition setting and which determines the oxidation induction time of the resin.

On the other hand, the oxidation induction time derivation function unit Fg has the function of determining, from the database 3 described above, the oxidation induction time Tg based on the oxidation induction conditions including at least the resin R which is used and the heating temperature TH which is set. In the present embodiment, since the surface material Mf of the screw 4 is included as the oxidation induction condition, when the oxidation induction time Tg is determined, as shown in FIG. 7, three items of the resin R which is used, the heating temperature TH which is set and the surface material Mf of the screw 4 are provided to the database 3, and thus it is possible to obtain the oxidation induction time Tg corresponding to these three items from a function computation or the data table.

In this case, as the heating temperature TH, the highest heating temperature TH of a plurality of heating temperatures TH is set (selected). Specifically, as described previously, the heating tube 7 includes a plurality of heating portions 11f, 11m, 11r, 11h and 11n from the front side to the back side, the metering zone Zm, the compression zone Zc and the feed zone Zf in the screw 4 are generally set so as to have individually different heating temperatures and thus the highest heating temperature TH of the individual heating temperatures TH which are set is selected. As described above, when the heating temperature TH is set, the highest heating temperature TH of a plurality of heating temperatures TH is set, and thus the maximum level of the heating temperature TH serving as a deterioration factor can be applied, with the result that it is advantageously possible to contribute to more dependable deterioration prevention on the resin R with consideration given to a temperature margin.

Figure 9:
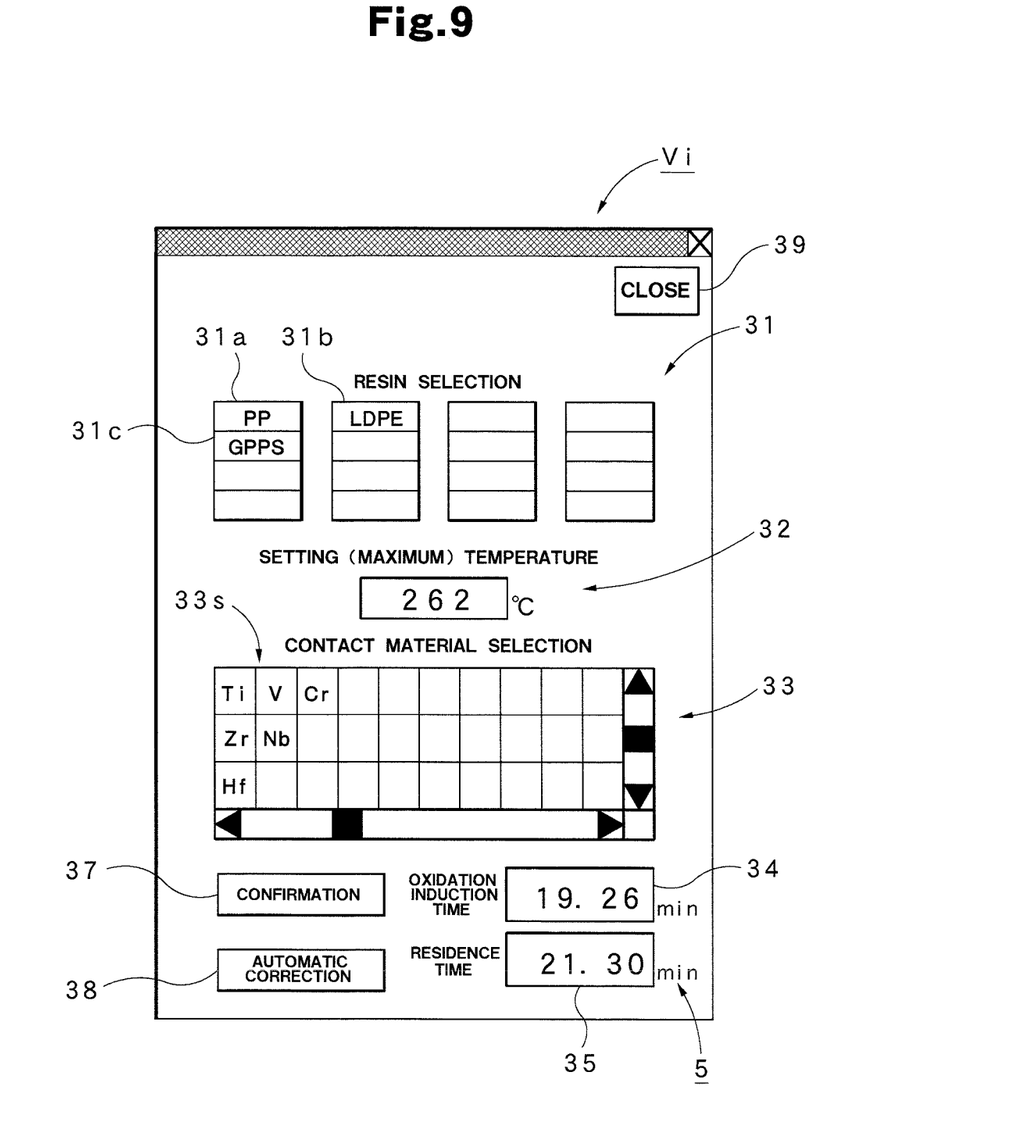
FIG. 9 a screen configuration diagram showing an example of an input setting screen in the device for assisting the molding condition setting according to the present invention.

Hence, the oxidation induction time derivation function unit Fg includes the setting screen display function unit Fv that displays an input setting screen Vi on which at least the type of resin R and the heating temperature TH are input. FIG. 9 shows an example of the input setting screen Vi. The illustrated input setting screen Vi includes a resin selection portion 31 in an upper section, a setting temperature input portion 32 in the upper portion of a middle section and a material selection portion 33 in the lower portion of the middle section. In this way, in the resin selection portion 31, the resin R which is used can be set by the selection of resin selection keys 31a, 31b, 31c and the like which are individually provided for the resins R. A numeric keypad screen (unillustrated) is displayed by touching a display, and thus the setting temperature input portion 32 can be set by inputting numeric values with the numeric keypad screen. The heating temperatures TH which are set may be automatically displayed. Furthermore, also in the material selection portion 33, for example, a material selection screen 33s corresponding to the periodic table of substances is displayed, and thus it is possible to select the material Mf. In the upper portion of a lower section of the input setting screen Vi, an oxidation induction time display portion 34 which displays the obtained oxidation induction time Tg is provided.

As described above, in the oxidation induction time derivation function unit Fg, the setting screen display function unit Fv is provided that displays the input setting screen Vi on which at least the type of resin R and the heating temperature TH are input, and thus the user can make an input (setting) such as by a selection operation according to the input setting screen Vi, with the result that it is advantageously possible to easily and rapidly derive the oxidation induction time Tg.

On the other hand, the correction assistance function unit Fs has, a basic function, the function of performing assistance processing in which the oxidation induction time Tg determined with the oxidation induction time derivation function unit Fg described above is compared with a residence time Ts until the molten resin R is charged into the mold 2 that is calculated from molding conditions and in which at least when the oxidation induction time Tg is shorter than the residence time Ts, the molding conditions are corrected so as to short the residence time Ts or to prolong the oxidation induction time Tg.

Hence, the correction assistance function unit Fs includes, as specific functions, the time display function unit Ft and the automatic correction function unit Fc. In this case, the time display function unit Ft has the function of displaying the residence time Ts and the oxidation induction time Tg on a predetermined time display portion 5, and the automatic correction function unit Fc has the function of automatically correcting the set molding conditions based on the result of comparison between the residence time Ts and the oxidation induction time Tg. In FIG. 9, 38 represents an automatic correction start key when the automatic correction processing is utilized.

In the illustration, the time display function unit Ft includes a residence time display portion 35 for displaying the residence time Ts in the lower portion of the lower section of the input setting screen Vi shown in FIG. 9, and the residence time display portion 35 and the oxidation induction time display portion 34 described above form the time display portion 5.

In this case, the residence time Ts can be calculated by a computation formula shown in formula (3). In formula (3), Vsc represents the total groove volume of the screw 4, Vsh represents one shot volume and Tc represents a cycle time.

$$Ts=(Vsc+Vsh) \times Tc/Vsh \quad (3)$$

Figure 8:
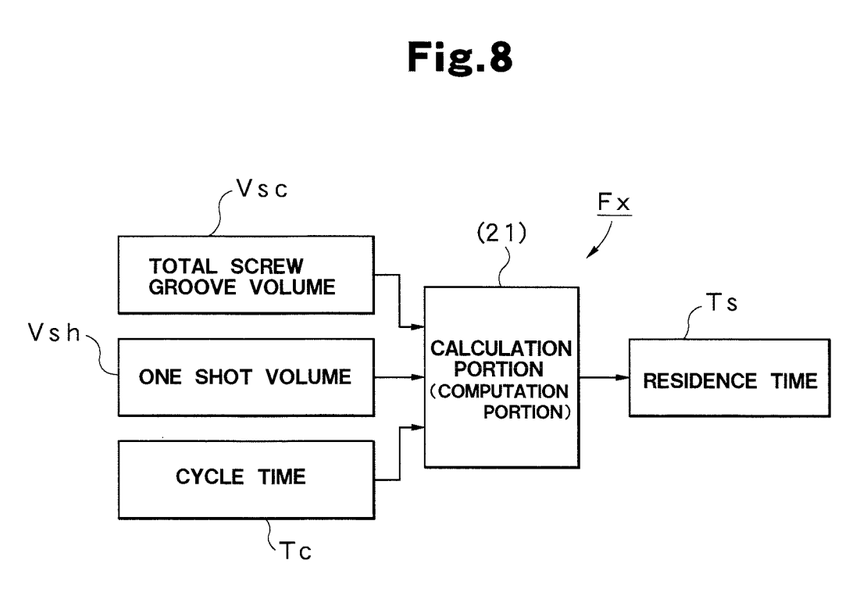
FIG. 8 a function block diagram of a residence time calculation function unit which is included in the device for assisting the molding condition setting and which calculates the residence time of the resin.

Hence, since the residence time Ts can be calculated from the set molding conditions, the residence time Ts which is separately calculated by formula (3) may be directly input so as to be displayed. Alternatively, in the molding machine controller 21, a residence time calculation function unit Fx shown in FIG. 8 is provided, data necessary for calculation is input as the molding conditions and the calculation processing by formula (3) is performed, with the result that the result of the calculation may be displayed.

In this way, the user can simultaneously and visually confirm the residence time Ts and the oxidation induction time Tg displayed on the time display portion 5 so as to compare them, and thus it is possible to perform correction processing on the molding conditions by a manual operation which includes intuition and know-how. In FIG. 9, 37 represents a confirmation key, and 39 represents a closing key.

As shown in FIG. 2, the automatic correction function unit Fc has the function of comparing the residence time Ts and the oxidation induction time Tg obtained and performing, when the oxidation induction time Tg is shorter than the residence time Ts, since it is highly likely that the resin R is deteriorated, residence time correction processing for shortening the residence time Ts or heating temperature correction processing for lowering the heating temperature TH. In this case, the residence time correction processing for shortening the residence time Ts is included, and thus even when there is a limitation on the correction of the oxidation induction time Tg such as a case where the heating temperature TH can no longer be lowered, the residence time Ts can be corrected. Hence, for example, necessary correction processing such as the shortening of the cycle time can be performed. On the other hand, the heating temperature correction processing for lowering the heating temperature TH is included, and thus the degradation rate can be reduced by lowering the heating temperature TH, with the result that effective correction processing for prolonging the oxidation induction time Tg can easily be performed.

As described above, as the assistance processing, the automatic correction processing is used which automatically corrects the molding conditions based on the result of the comparison between the residence time Ts and the oxidation induction time Tg, and thus automatic correction can be performed without dependence on the operation of the user, with the result that even when the user is a beginner or the like, it is advantageously possible to reliably avoid the deterioration of the resin R.

Figure 1:
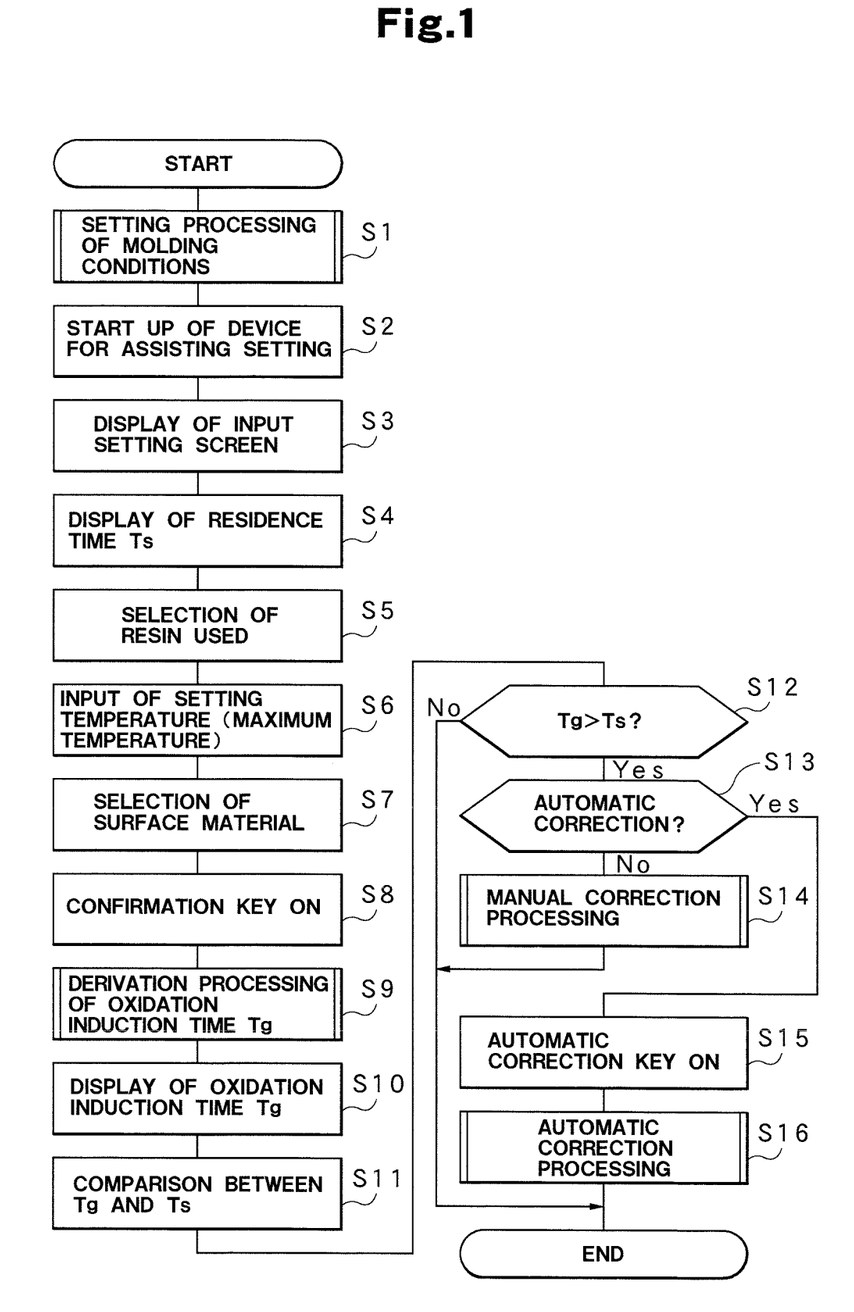
FIG. 1 a flowchart showing a processing procedure for a method for assisting a molding condition setting according to a preferred embodiment of the present invention.

A method for assisting the molding condition setting according to the present embodiment which includes a method of using the device 1 for assisting the molding condition setting that has the configuration (function) as described above will then be described with reference to a flowchart shown in FIG. 1 and drawings.

The user first performs setting processing on the molding conditions in the injection molding machine M according to a normal setting procedure (step S1). After the completion of the setting processing on the molding conditions, when the method for assisting the molding condition setting according to the present embodiment is utilized, a predetermined assistance start key (unillustrated) is turned on, and thus the device 1 for assisting the molding condition setting is started up (step S2). In this way, on the display 23 of the injection molding machine M, the input setting screen Vi shown in FIG. 9 is displayed (step S3). Here, in the residence time display portion 35 of the input setting screen Vi, the residence time Ts corresponding to the molding conditions described above is displayed (step S4). As the residence time Ts, as described above, the residence time Ts which is separately calculated by formula (3) may be directly input as one of the molding conditions at the time of the setting processing on the molding conditions or the total groove volume Vsc of the screw 4, the one shot volume Vsh and the cycle time Tc may be set as the molding conditions at the time of the setting processing on the molding conditions. In this way, the calculation processing based on formula (3) is automatically performed, and the result of the calculation is automatically displayed.

Various types of items for using the input setting screen Vi to determine the oxidation induction time Tg, that is, the resin R which is used, the highest heating temperature TH of the set heating temperatures and the surface material Mf of the screw 4 are individually set (input). In this case, the resin R can be set in the resin selection portion 31 by selecting (turning on) the corresponding resin selection key 31a, 31b, 31c or the like (step S5). On the other hand, the heating temperature TH can be directly input into the setting temperature input portion 32 with, for example, the numeric keypad screen which is previously described and which is separately displayed (step S6). Since the heating temperature TH has already been set as the molding condition, the heating temperature TH may be automatically displayed by program processing in the molding machine controller 21. Furthermore, as the surface material Mf of the screw 4, the corresponding material is selected with a material selection screen 33s in the material selection portion 33 (step S7). As a method for the selection, for example, in the case of "Cr$_2$N" described previously, "Cr" is first selected, then "2" is selected with the numeric keypad screen and thereafter, for example, "N" is selected, with the result that "Cr$_2$N" can be input (set).

When the setting described above is completed, a confirmation key 37 is selected (turned on) (step S8). In this way, with the oxidation induction time derivation function unit Fg described above, the derivation processing for the oxidation induction time Tg is performed (step S9). Then, the obtained oxidation induction time Tg is displayed on the oxidation induction time display portion 34 (step S10). In this way, the user can easily and visually confirm and compare both the oxidation induction time Tg displayed on the oxidation induction time display portion 34 and the residence time Ts displayed on the residence time display portion 35 (step S11). Here, when the residence time Ts is shorter than the oxidation induction time Tg, since the resin R is prevented from being deteriorated, the closing key 39 is turned on, and thus the molding condition assistance processing can be completed (step S12).

On the other hand, when the oxidation induction time Tg is shorter than the residence time Ts, since it is highly likely that the resin R is deteriorated, the assistance processing which corrects the molding conditions with the correction assistance function unit Fs is performed so as to shorten the residence time Ts or to prolong the oxidation induction time Tg (step S12). In this case, the user can also perform correction by a manual operation based on the knowledge, the experience and the like of the user. Specifically, since the residence time Ts and the oxidation induction time Tg are displayed on the time display portion 5, the user can perform the correction processing (resetting) on the molding conditions while checking the time displayed, with the result that the intuition and know-how of the user can be utilized (steps S13 and S14).

By contrast, when the user is a beginner or the like and requests automatic correction processing, it is possible to perform the automatic correction processing. When the automatic correction processing is performed, an automatic correction key 38 is turned on (step S15). In this way, by the automatic correction processing with the automatic correction function unit Fc, the molding conditions are automatically corrected (step S16). In this case, the comparison processing in step S11 is automatically performed with the automatic correction function unit Fc, and based on the result of the comparison processing, for example, the residence time correction processing for shortening the residence time Ts or the heating temperature correction processing for lowering the heating temperature TH is automatically performed. As the automatic correction processing, the residence time correction processing is used, and thus even when there is a limitation on the correction of the oxidation induction time Tg such as a case where the heating temperature TH can no longer be lowered, the residence time Ts can be corrected. Hence, for example, necessary correction processing such as the shortening of the cycle time can be performed. As the automatic correction processing, the heating temperature correction processing is used, and thus the degradation rate can be reduced by lowering the heating temperature TH, with the result that effective correction processing for prolonging the oxidation induction time Tg can easily be performed. Thus, the automatic correction function unit Fc described above is utilized, and thus the automatic correction can be performed without dependence on the operation of the user, with the result that even when the user is a beginner or the like, it is possible to reliably avoid the deterioration of the resin R.

Hence, when the device 1 for assisting the molding condition setting and the method for assisting the molding condition setting described above and according to the present embodiment are used, at the time of setting of the molding conditions, the oxidation induction time derivation processing is performed, and thus the oxidation induction time Tg based on the oxidation induction conditions including at least the resin R which is used and the heating temperature TH which is set is determined from the database 3 and the assistance processing is performed in which the determined oxidation induction time Tg is compared with the residence time Ts until the molten resin R is charged into the mold 2 that is calculated from the set molding conditions and in which when the oxidation induction time Tg is shorter than the residence time Ts, the molding conditions are corrected so as to shorten the residence time Ts or to prolong the oxidation induction time Tg. Thus, it is possible to cope with various deterioration factors at the time of molding which cause factors, other than a factor in which the operation of the molding machine Mo is interrupted so as to prolong the residence time Ts of the resin R, such as a factor in which the degradation rate is faster than expected due to the nonconformity of the molding conditions and the type of resin R used, with the result that it is possible to reliably avoid the deterioration of the resin R at the time of molding. Even when on the side of the user, the user does not have knowledge, experience and the like on the deterioration of the resin R in a residence state, the user can easily set the molding conditions under which the resin R is prevented from being deteriorated, with the result that, for example, a molding operation with a high yield can be performed so as to enhance productivity.

Although the preferred embodiment is described in detail above, the present invention is not limited to such an embodiment, and detailed configurations, shapes, materials, quantities, values, methods and the like can be arbitrarily changed, added and deleted without departing from the spirit of the present invention.

For example, although the case is illustrated where as the oxidation induction condition, the type of surface material Mf of the screw 4 in the injection molding machine M is included, the surface material Mf of the inner surface of the heating tube 7 and the surface material Mf of the inner surface of cavities in the mold 2 may be included. Although the case is illustrated where when the heating temperature TH is set, the highest heating temperature TH of a plurality of heating temperatures TH is set, another setting method such as the average value of a plurality of heating temperatures TH may be adopted. On the other hand, although in the embodiment, the example is described where both the manual correction processing which manually corrects the molding conditions and the automatic correction processing which automatically corrects the molding conditions are provided, an embodiment in which only any one of them is incorporated may be provided. Furthermore, although as the automatic correction processing which automatically corrects the molding conditions, the residence time correction processing for shortening the residence time Ts and the heating temperature correction processing for lowering the heating temperature TH are illustrated, another correction method such as a method for enhancing the rotation speed of the screw 4 may be used. Although the case is illustrated where the setting screen display function unit Fv for displaying the input setting screen Vi is provided, the display form is an example, and for example, in a case where only the automatic correction processing is performed, a display form may be adopted in which only when the oxidation induction time Tg is shorter than the residence time Ts, for example, an alarm lamp is turned on.

INDUSTRIAL APPLICABILITY

The method and the device for assisting the molding condition setting according to the present invention can be utilized in various types of molding machines such as an injection molding machine in which a resin heated at a predetermined heating temperature is charged into a mold and in which the resin is molded and an extruder.

The invention claimed is:

1. A system, comprising:

a molding machine for charging a resin molten by heating at a predetermined heating temperature into a mold so as to mold the resin, the molding machine including:
   a screw;
   heating portions surrounding the screw; and
   a screw drive portion; and a device for assisting a molding condition setting which is used when a molding condition is set in the molding machine, the device comprising:
   a database in which oxidation induction times indicating deteriorations of individual resins based on combinations of a plurality of oxidation induction conditions including at least different types of resins and different heating temperatures are set;
   a processor programmed to:
      determine, from the database, an oxidation induction time based on oxidation induction conditions including at least the resin which is used and the heating temperature which is set;
      calculate a residence time until the molten resin is charged into the mold from the set molding condition, wherein the calculation of the residence time is separate from the determination of the oxidation induction time;
      compare the oxidation induction time with the residence time; and
      in response to a determination that the oxidation induction time is shorter than the residence time, correct the molding condition so as to shorten the residence time or to prolong the oxidation induction time; and
   a driver connected to the processor and configured to be connected to the screw drive portion of the molding machine and to drive the screw for charging the molten resin according to the corrected molding condition,
   wherein the device is connected to the molding machine and is configured to control the molding machine to operate to charge the resin molten into the mold by driving the screw and energizing the heating portions according to the corrected molding condition, and
   wherein the oxidation induction conditions include a type of surface material of the screw in an injection molding machine.

2. The device for assisting the molding condition setting according to claim 1, further comprises a display displaying an input setting screen on which at least the type of resin and the heating temperature are input.

3. The device for assisting the molding condition setting according to claim 1,
   wherein the database includes a data table.

4. The device for assisting the molding condition setting according to claim 1,
   wherein the database includes a computation formula.

5. The device for assisting the molding condition setting according to claim 1, further comprises a display displaying on a predetermined time display portion, the residence time and the oxidation induction time determined from the database.

6. The device for assisting the molding condition setting according to claim 1,
   wherein the processor is programmed to further automatically correct the set molding condition based on a result of the comparison between the residence time and the oxidation induction time determined from the database.

* * * * *